(12) United States Patent
Kasai

(10) Patent No.: US 8,482,679 B2
(45) Date of Patent: Jul. 9, 2013

(54) ILLUMINATION DEVICE, DISPLAY DEVICE, AND TELEVISION RECEIVER

(75) Inventor: Nobuhiro Kasai, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 13/379,106

(22) PCT Filed: Feb. 17, 2010

(86) PCT No.: PCT/JP2010/052310
§ 371 (c)(1),
(2), (4) Date: Dec. 19, 2011

(87) PCT Pub. No.: WO2011/004623
PCT Pub. Date: Jan. 13, 2011

(65) Prior Publication Data
US 2012/0099027 A1    Apr. 26, 2012

(30) Foreign Application Priority Data
Jul. 9, 2009  (JP) ................................ 2009-162447

(51) Int. Cl.
*H04N 5/50* (2006.01)
(52) U.S. Cl.
USPC ....................................................... 348/790
(58) Field of Classification Search
USPC .................. 348/790, 791, 794, 836; 362/634, 362/632, 615, 430
See application file for complete search history.

(56) References Cited

U.S. PATENT DOCUMENTS

| | | | |
|---|---|---|---|
| 7,597,469 B2 * | 10/2009 | Nishigaki | 362/616 |
| 8,021,033 B2 * | 9/2011 | Tokita et al. | 362/615 |
| 8,023,061 B2 * | 9/2011 | Ra | 349/58 |
| 2007/0058358 A1 * | 3/2007 | Chikazawa et al. | 362/97 |
| 2007/0127272 A1 * | 6/2007 | Yang et al. | 362/634 |
| 2008/0158137 A1 * | 7/2008 | Yoshida | 345/102 |
| 2010/0246197 A1 * | 9/2010 | Takahashi et al. | 362/430 |

FOREIGN PATENT DOCUMENTS

| | | |
|---|---|---|
| JP | 2005-019065 A | 1/2005 |
| JP | 2006-301209 A | 11/2006 |
| JP | 2008-041546 A | 2/2008 |
| JP | 2008-147147 A | 6/2008 |
| JP | 2008-304500 A | 12/2008 |
| JP | 2009-076456 A | 4/2009 |
| JP | 2009-140835 A | 6/2009 |
| WO | 2008/007492 A1 | 1/2008 |

* cited by examiner

OTHER PUBLICATIONS

Official Communication issued in International Patent Application No. PCT/JP2010/052310, mailed on May 18, 2010.

*Primary Examiner* — Paulos M Natnael
(74) *Attorney, Agent, or Firm* — Keating & Bennett, LLP

(57) ABSTRACT

A backlight unit (49) for a display device (69) provided with a liquid crystal display panel (59) comprises a chassis (41), a diffusion plate (43) supported by the chassis, and point-like light sources supported by mounting substrates (21) provided on the chassis. The point-like light sources comprise LEDs (22) mounted on the mounting substrates. The mounting substrates are connected to each other by connectors (25) to form rows (26) of the mounting substrates, and the rows (26) are arranged side by side. The rows of the mounting substrates each consist of two, short and long mounting substrates, and the rows are arranged in a mixed state in such a manner that each row consisting of the two, short and long mounting substrates is reversed with respect to each other. As a result, the positions of the connectors are not aligned rectilinearly in the direction in which the rows of the mounting substrate are arranged.

22 Claims, 8 Drawing Sheets

ILLUMINATION DEVICE, DISPLAY DEVICE, AND TELEVISION RECEIVER

TECHNICAL FIELD

The present invention is related to an illumination device, a display device including the illumination device, and a television receiver incorporating the display device.

BACKGROUND ART

A display device using a non-self-luminous display panel such as, for example, a liquid crystal display panel is used typically in combination with an illumination device that illuminates the display panel from behind. An illumination device of this type uses any of various types of light sources including a cold cathode tube, a light emitting element, and the like. Examples of a light emitting element include a light emitting diode (hereinafter, referred to as "LED"), an organic electroluminescent element, an inorganic electroluminescent element, and the like, among which the most commonly used today is an LED. An illumination device described in Patent Document 1 also uses an LED as a light source.

In the illumination device described in Patent Document 1, as shown in FIG. 6, an LED 122 is mounted on a mounting substrate 121, and a lens 124 that covers the LED 122 is mounted to the mounting substrate 121. The mounting substrate 121, the LED 122, and the lens 124 constitute a light emitting module mj. A multitude of light emitting modules mj are disposed in a matrix form to form a planar light source.

While in the illumination device described in Patent Document 1, a multitude of point light sources are arranged, in an illumination device described in Patent Document 2, a multitude of linear light sources such as cold cathode tubes are arranged. In a case where, as described above, a display device is used in combination with an illumination device in which a plurality of light sources are arranged, if light from the light sources directly enters the illumination device, there occurs unevenness in brightness on a screen, and hence in order to prevent this, a diffusion plate that diffuses light is disposed between the light sources and the display device. As is also the case with Patent Document 2, a diffusion plate is generally used as a constituent component of an illumination device.

In a case where a multitude of point light sources are arranged to form a planar light source, when an increased area needs to be illuminated, a configuration may be required in which a plurality of mounting substrates each supporting a plurality of point light sources are arranged. Patent Document 3 shows one example of such a configuration.

LIST OF CITATIONS

Patent Literature

Patent Document 1: JP-A-2008-41546
Patent Document 2: JP-A-2005-19065
Patent Document 3: JP-A-2006-301209

SUMMARY OF THE INVENTION

Technical Problem

In a case where, as in an illumination device described in Patent Document 3, a plurality of mounting substrates each supporting point light sources are arranged to form a planar light source, each pair of adjacent ones among the mounting substrates are connected to each other with a connector. Due to such a connector, there may occur unevenness in luminance of a diffusion plate. The following describes this with reference to FIGS. 7 and 8.

A mounting substrate 101 shown in FIG. 7 has a rectangular strip shape, and a plurality of point light sources 102 each composed of a light emitting element are mounted on the mounting substrate 101 along a longitudinal direction thereof at a predetermined spacing from each other. As the mounting substrate 101, there are a type that supports five point light sources 102 and a type that supports eight point light sources 102, and these different types of mounting substrates 101 are arranged in series and connected to each other with a connector 103 and thus form a mounting substrate row 104. A plurality (seven in the figure) of the mounting substrate rows 104 are arranged in parallel to form a planar light source having a rectangular shape as a whole.

FIG. 8 shows a diffusion plate 105 illuminated by the above-described planar light source. Having a low light reflectance, the connector 103 is viewed as a shadow S. With the connectors 103 positionally aligned as shown in FIG. 7, the shadows S lie in a straight line, so that unevenness in luminance of the diffusion plate is clearly perceived.

The present invention has been made in view of the foregoing and has as its object, in an illumination device including a diffusion plate, a chassis supporting the diffusion plate, and a light source made up of a plurality of mounting substrates each supporting a plurality of point light sources, to obscure unevenness in luminance of the diffusion plate caused by connectors each connecting the mounting substrates.

Solution to the Problem

According to a preferred embodiment of the present invention, in an illumination device including: a diffusion plate; a chassis that supports the diffusion plate; and a light source that is disposed on the chassis and made up of a plurality of mounting substrates each supporting a plurality of point light sources, a plurality of the mounting substrates are connected to each other with a connector to form a mounting substrate row; a plurality of the mounting substrate rows are disposed in parallel; and positions of the connectors are not aligned straight in a direction in which the mounting substrate rows are arranged.

According to this configuration, since the positions of the connectors are not aligned straight, shadows appearing on the diffusion plate due to the presence of the connectors are dispersed, and thus unevenness in luminance of the diffusion plate is obscured.

According to a preferred embodiment of the present invention, in the illumination device having the above-described configuration, the chassis has a rectangular shape in plan view, and the mounting substrate row is disposed parallel to a longitudinal direction of the chassis.

According to a preferred embodiment of the present invention, in the illumination device having the above-described configuration, each of the mounting substrates has a shape having a longitudinal direction, and a plurality of the mounting substrates are aligned with each other along the longitudinal direction to form the mounting substrate row.

According to this configuration, with a plurality of types of mounting substrates different in length, in other words, different in the number of the point light sources disposed thereon prepared in advance, even an illumination device of a different size can be easily formed by changing a combination of types of mounting substrates to be connected to each other with the connector. This eliminates the need to design mounting substrates dedicated to each of illumination devices of different sizes and thus contributes to cost reduction.

According to a preferred embodiment of the present invention, in the illumination device having the above-described configuration, a long mounting substrate and a short mounting substrate form the mounting substrate row, and a disposition of the long and the short mounting substrates are reversed row by row.

According to this configuration, it is easily possible to design so that the positions of the connectors are not aligned straight. Furthermore, this configuration requires only two types of mounting substrates and thus does not lead to a considerable cost increase.

According to a preferred embodiment of the present invention, in the illumination device having the above-described configuration, the plurality of point light sources are disposed in a line parallel to the longitudinal direction of each of the mounting substrates.

According to this configuration, since how the point light sources are installed is determined univocally depending on how each of the mounting substrates is installed, designing a disposition of the point light sources is facilitated.

According to a preferred embodiment of the present invention, in the illumination device having the above-described configuration, the plurality of point light sources are disposed in the line at an equal spacing from each other.

According to this configuration, since how the point light sources are disposed does not vary depending on the type of each of the mounting substrates, each of the mounting substrates can be used even in a case where the illumination device is changed in size.

According to a preferred embodiment of the present invention, in the illumination device having the above-described configuration, the connector is made up of a combination of connector halves that are mounted respectively to one and the other of the mounting substrates to be connected, and at least one of the connector halves protrudes outward from an end portion of the mounting substrate to which the connector half is mounted.

According to this configuration, since, when each pair of adjacent ones among the mounting substrates are connected with the connector, at least one of the connector halves protrudes outward from an end portion of the mounting substrate to which the connector half is mounted, the connector halves can be easily connected to each other.

According to a preferred embodiment of the present invention, in the illumination device having the above-described configuration, an outer surface of the connector has a bright color.

According to this configuration, the light reflectance of the connector is increased, and thus the connector becomes less likely to absorb light, so that unevenness in luminance of the diffusion plate is obscured.

According to a preferred embodiment of the present invention, in the illumination device having the above-described configuration, the point light sources on the mounting substrate are electrically connected in series as one unit.

According to this configuration, a current of equal magnitude can be supplied to each of the point light sources, and thus the mount of light emitted from each of the point light sources can be made uniform, so that the luminance uniformity of the diffusion plate can be improved.

According to a preferred embodiment of the present invention, in the illumination device having the above-described configuration, a plurality of the mounting substrate rows are covered with a reflection sheet, and pass-through openings for exposing the point light sources and the connectors are formed through the reflection sheet.

According to this configuration, the luminance of the diffusion plate can be increased through the use of the reflection sheet.

According to a preferred embodiment of the present invention, in the illumination device having the above-described configuration, each of the point light sources is a light emitting element mounted on the mounting substrate, and the light emitting element is covered with a lens.

According to this configuration, a point light source capable of adjusting the directivity of light by use of a lens can be obtained.

According to a preferred embodiment of the present invention, in the illumination device having the above-described configuration, the lens has a light diffusing function.

According to this configuration, the degree of divergence of light emitted from the light emitting element becomes large, and thus a large area can be illuminated by using a relatively small number of light emitting elements.

According to a preferred embodiment of the present invention, in the illumination device having the above-described configuration, the light emitting element is an LED.

According to this configuration, through the use of an LED, which has recently been remarkably improved in luminance, an illumination device that emits light with high brightness can be obtained. Furthermore, the longer life and lower power consumption of a light source can be achieved.

According to a preferred embodiment of the present invention, in the illumination device having the above-described configuration, the LED is obtained by applying a phosphor having a light emission peak in a yellow region to a blue light emitting chip to gain white light.

According to a preferred embodiment of the present invention, in the illumination device having the above-described configuration, the LED is obtained by applying phosphors having light emission peaks in green and red regions, respectively, to a blue light emitting chip to gain white light.

According to a preferred embodiment of the present invention, in the illumination device having the above-described configuration, the LED is obtained by applying a phosphor having a light emission peak in a green region to a blue light emitting chip and by using the blue light emitting chip in combination with a red light emitting chip to gain white light.

According to a preferred embodiment of the present invention, in the illumination device having the above-described configuration, the LED is obtained by using, in combination, light emitting chips of respective colors of blue, green, and red to gain white light.

A white light emitting LED emits white light that tends to vary in color tone due to, for example, a high degree of blueness. White light emitted according to the present invention has a leveled color tone, and thus illumination light with a substantially uniform color tone can be obtained.

According to a preferred embodiment of the present invention, in the illumination device having the above-described configuration, the LED is obtained by using an ultraviolet light chip in combination with a phosphor.

According to a preferred embodiment of the present invention, in the illumination device having the above-described configuration, the LED is obtained by applying phosphors having light emission peaks in blue, green, and red regions, respectively, to an ultraviolet light chip to gain white light.

In a case where an ultraviolet light chip is used as a light source, resulting light tends to vary in color tone. According to the configuration of the present invention, resulting light has a leveled color tone, and thus illumination light with a substantially uniform color tone can be obtained.

According to a preferred embodiment of the present invention, a display device includes: the illumination device according to any one of the above-described configurations; and a display panel that receives light from the illumination device.

According to this configuration, a display device having obscured unevenness in luminance can be obtained.

According to a preferred embodiment of the present invention, in the display device having the above-described configuration, the display panel is a liquid crystal display panel.

According to this configuration, a liquid crystal display device having obscured unevenness in luminance can be obtained.

According to a preferred embodiment of the present invention, a television receiver includes the display device having the above-described configuration.

According to this configuration, a television receiver having obscured unevenness in luminance of a screen can be obtained.

Advantageous Effects of the Invention

According to the present invention, in a case where a plurality of mounting substrates each supporting a plurality of point light sources are connected to each other with a connector to form a mounting substrate row, and a plurality of the mounting substrate rows are disposed in parallel to form a planar light source, shadows generated due to the presence of the connectors are dispersed, and thus an illumination device in which unevenness in luminance of a diffusion plate is obscured can be obtained.

DESCRIPTION OF EMBODIMENTS

Figure 1:
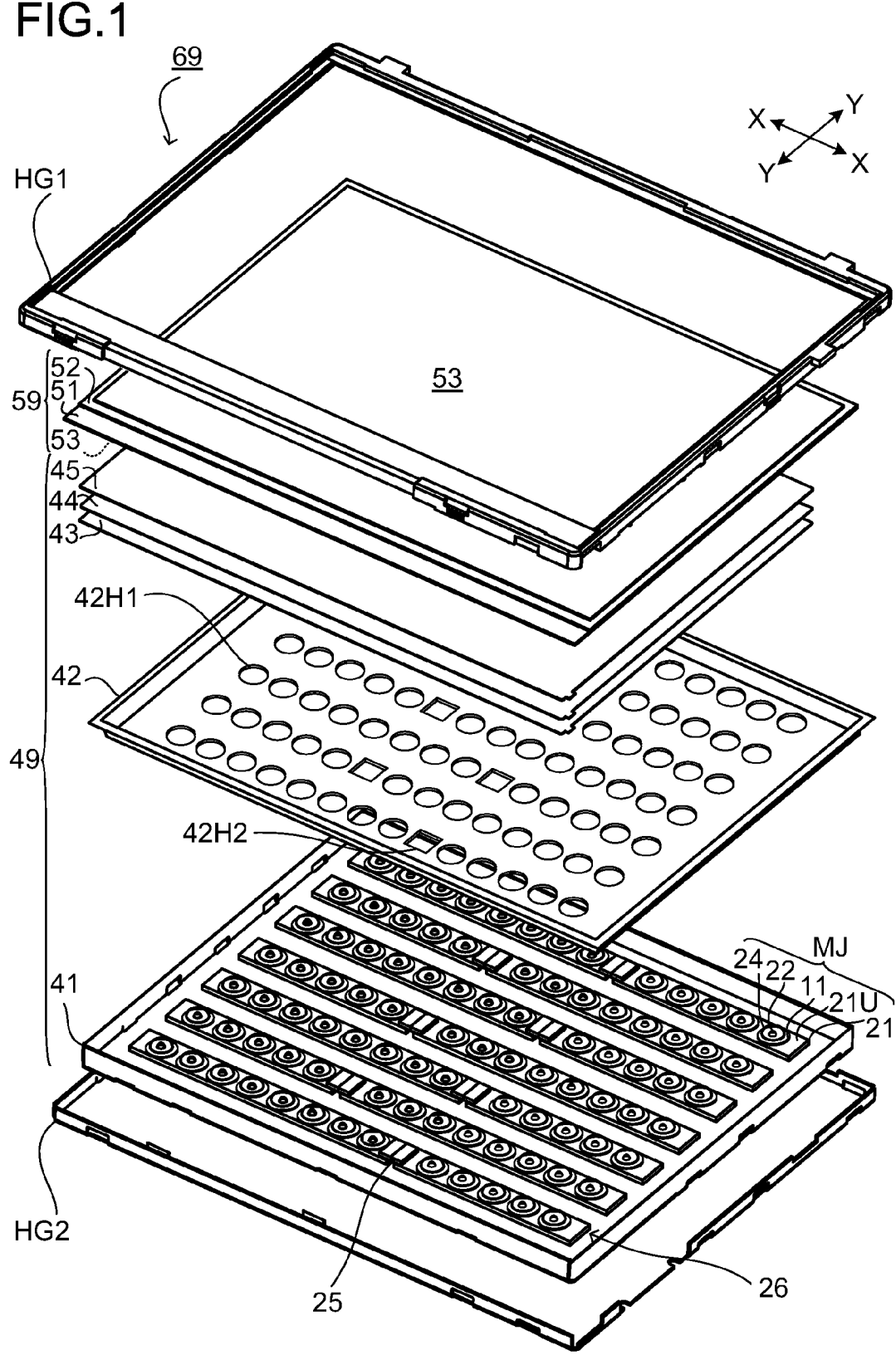
FIG. 1 is an exploded perspective view of a display device including an illumination device according to a preferred embodiment of the present invention.
Figure 2:
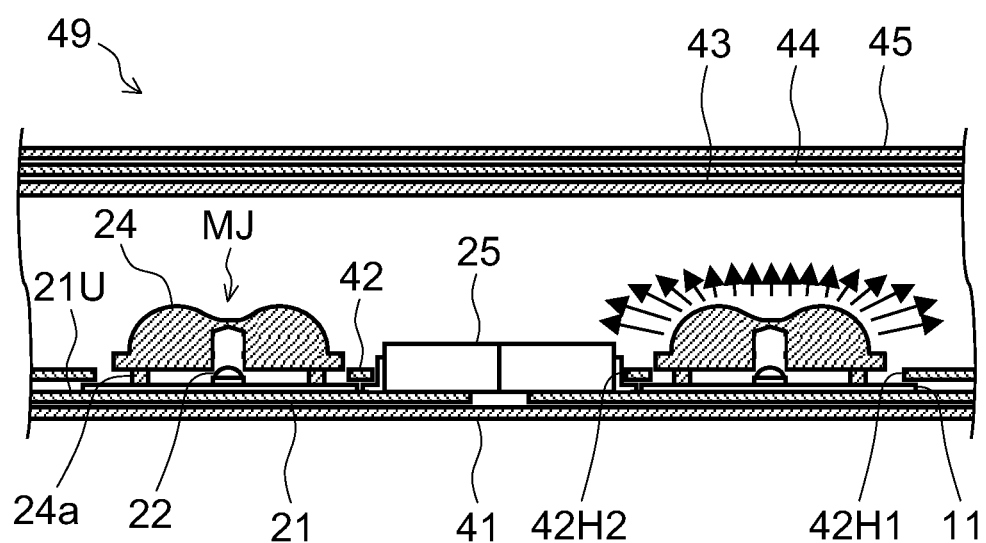
FIG. 2 is a partial cross-sectional view of the illumination device.

With reference to FIGS. 1 to 4, the following describes a structure of an embodiment of a display device including an illumination device according to a preferred embodiment of the present invention. In FIG. 1, a display device 69 is depicted in a state of being placed horizontally with its display surface facing upward.

The display device 69 incorporates a liquid crystal display panel 59 as a display panel. The liquid crystal display panel 59 and a backlight unit 49 that irradiates the liquid crystal display panel 59 from behind are housed in a housing. The housing is formed by joining a front housing member HG1 and a rear housing member HG2 together.

The liquid crystal display panel 59 is formed by fixing an active matrix substrate 51 including a switching element such as a thin film transistor (TFT) or the like to an opposed substrate 52 opposed to the active matrix substrate 51 by an unshown sealing material and by filling a space between the active matrix substrate 51 and the opposed substrate 52 with liquid crystal.

A polarization film 53 is attached to each of a light receiving surface side of the active matrix substrate 51 and an emission side of the opposed substrate 52. The liquid crystal display panel 59 forms images by utilizing variations in light transmittance due to a tilt of liquid crystal molecules.

The backlight unit 49 embodying the illumination device according to the present invention has the following configuration. That is, the backlight unit 49 includes a light emitting module MJ, a chassis 41, a large-sized reflection sheet 42, a diffusion plate 43, a prism sheet 44, and a microlens sheet 45.

The chassis 41 has a rectangular shape in plan view and is tray-shaped with rising walls formed on an outer periphery of a principal plane surface having the rectangular shape.

The light emitting module MJ includes a mounting substrate 21, a point light source disposed on the mounting substrate 21, a lens 24 that covers the point light source, and an embedded reflection sheet 11. The point light source is a light emitting element mounted on the mounting substrate 21. In this embodiment, an LED 22 is used as the light emitting element.

Figure 6:
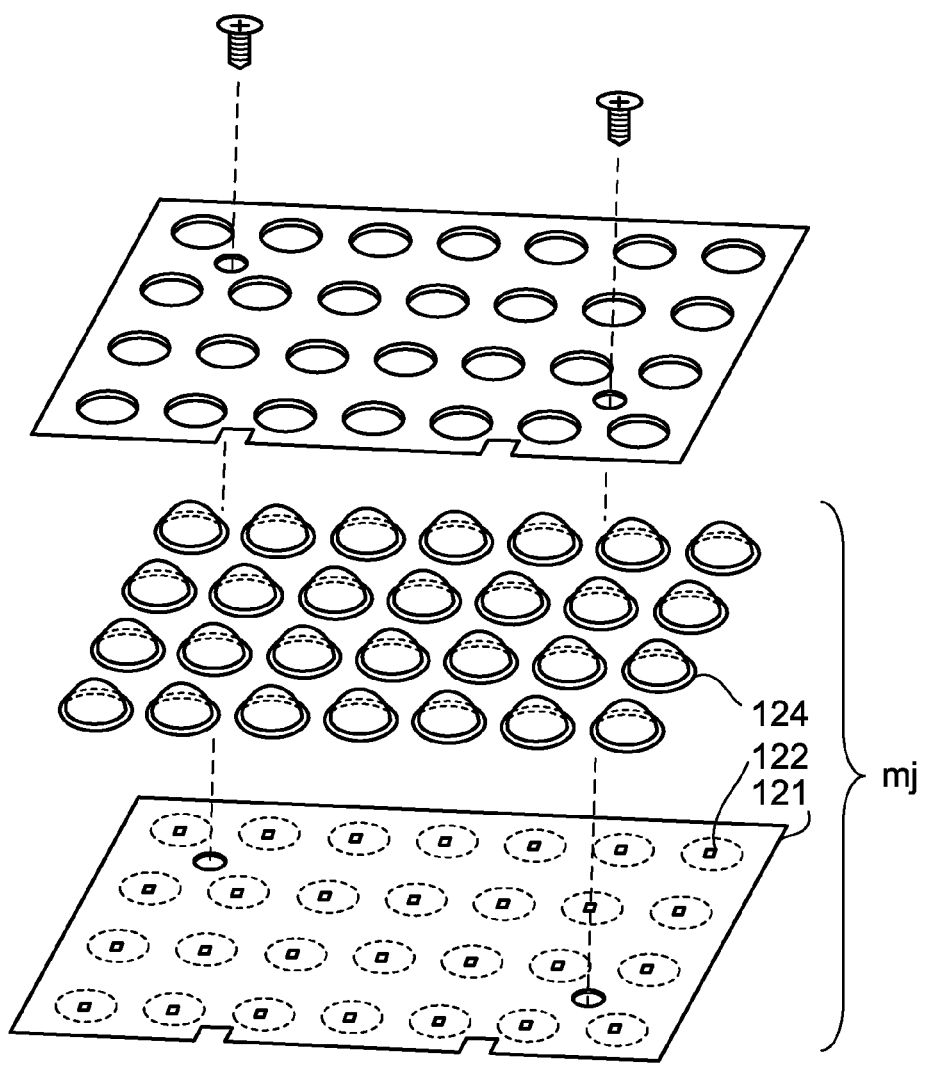
FIG. 6 is an exploded perspective view of a conventional illumination device.
Figure 7:
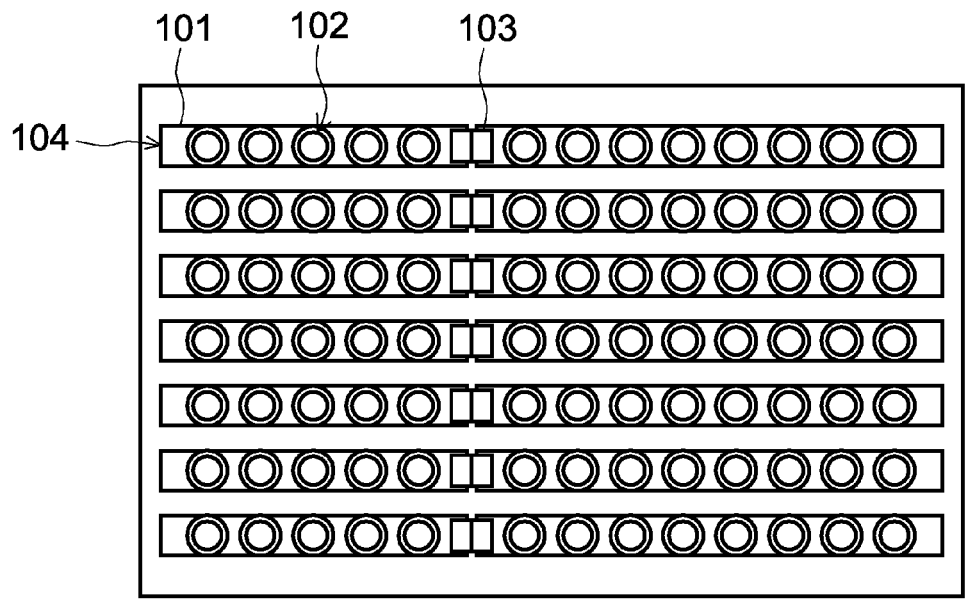
FIG. 7 is a plan view showing an example of a disposition of mounting substrates.
Figure 8:
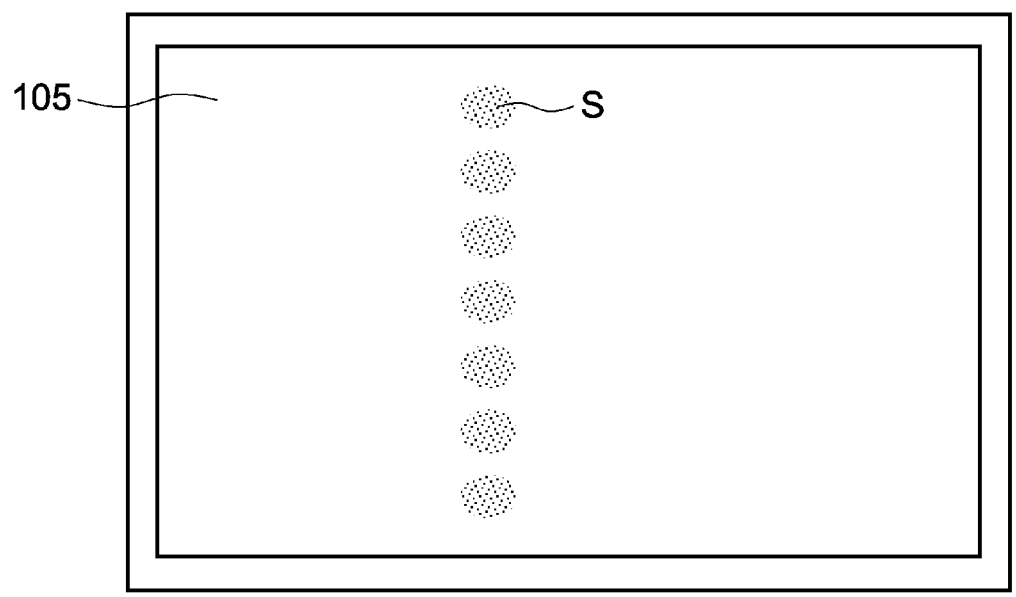
FIG. 8 is a plan view of a diffusion plate illuminated in a case where the mounting substrates are disposed as shown in FIG. 7.

The lens 24 has a light diffusing function. The following describes the significance of the light diffusing function of the lens 24. Taking the illumination device described in Patent Document 1 as an example, in the illumination device shown in FIG. 6, even though the LED 122 is used in combination with the lens 124, the degree of divergence of light emitted by each of the individual LEDs 122 is small. Because of this, in order to eliminate unevenness in luminance, it is required that a large number of light emitting modules mj be disposed at high density. This leads to an increase in component and mounting costs, rendering the device as a whole costly.

LEDs of recent years have been improved in luminance and thus made it possible to obtain an amount of light required to illuminate the entire surface of a screen by using a relatively smaller number of LEDs. Sparsely disposing high-luminance LEDs, however, inevitably causes unevenness in luminance, and it is, therefore, preferable to use each individual LED in combination with a lens having a light diffusing function. In this specification, a lend having a light diffusing function is referred to as "diffusion lens".

Figure 9:
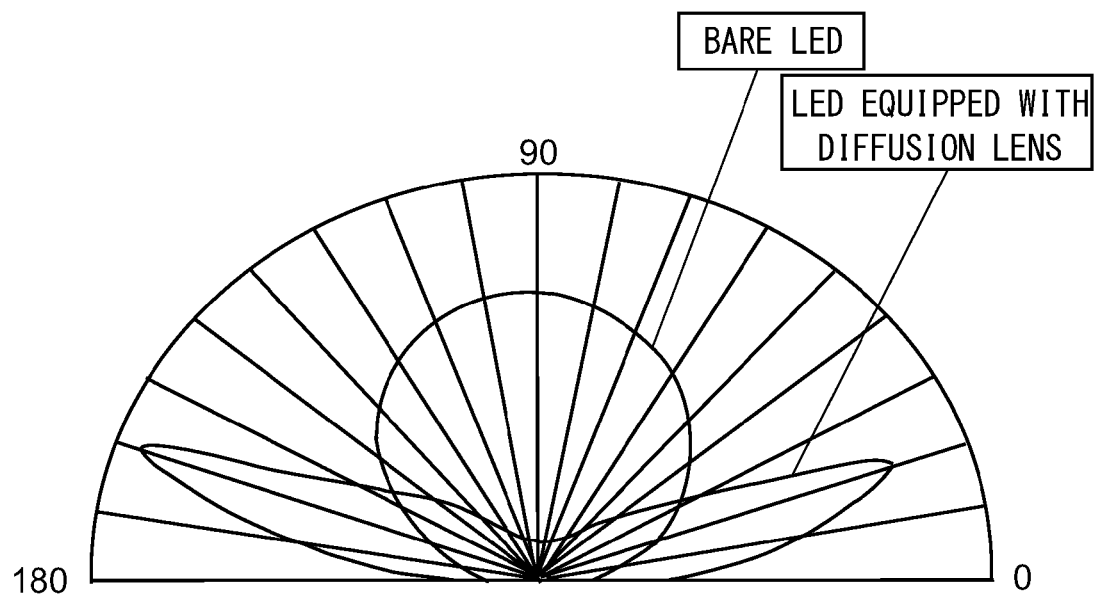
FIG. 9 is a graph showing how illuminance varies depending on an irradiation direction of an LED.

FIG. 9 is a graph showing how illuminance (unit: lux) varies depending on an irradiation direction of each of a bare LED and an LED equipped with a diffusion lens. In a case of the bare LED, the illuminance thereof reaches its peak at an angle of 90°, which is an optical axis angle thereof, and decreases sharply with increasing deviation of an angle from 90°. On the other hand, in a case of the LED equipped with the diffusion lens, an illuminance value equal to or greater than a given value can be secured at a wider range of angles, and the illuminance thereof can be set to reach its peak at an angle different from the optical axis angle. Needless to say, an illuminance pattern shown in the figure may vary in various ways depending on how the diffusion lens is designed.

Figure 10:
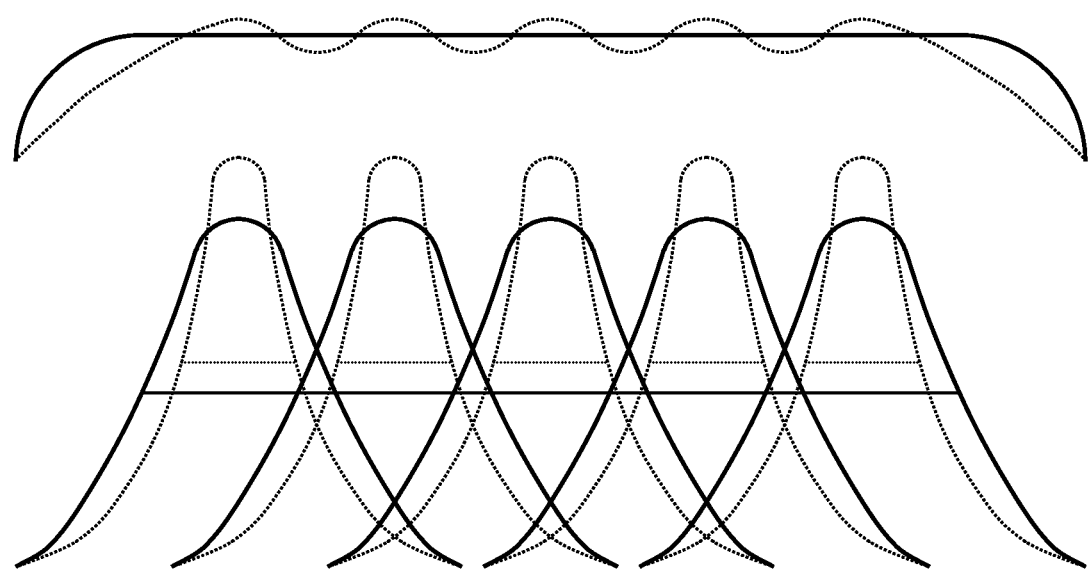
FIG. 10 is a conceptual view showing a collective luminance of a plurality of LEDs.

FIG. 10 shows a conceptual view of a collective luminance of a plurality of LEDs. In the figure, a waveform shown by a solid line indicates a luminance of an LED equipped with a diffusion lens, and a waveform shown by a dotted line indicates a luminance of a bare LED. A horizontal line drawn in a waveform indicates a width of the waveform at a luminance value half its peak value (full width at half maximum). In a case of the LEDs each equipped with the diffusion lens, each individual waveform having an increased width can be obtained, and thus a waveform of respective luminances in the collective form as a total luminance can be easily made flat as shown by the solid line on the upper side in the figure. On the other hand, in a case of the bare LEDs, each individual waveform obtained is large in height and small in width, so that a waveform of respective luminances in the collective form inevitably becomes uneven. An image having such unevenness in luminance is undesirable, and it is, therefore, substantially essential that an LED equipped with a diffusion lens be adopted.

In view of the above, the light emitting module MJ is configured to include the diffusion lens 24.

It is also possible to impart the light diffusing function to the diffusion lens 24 by subjecting a surface of the diffusion lens 24 facing the mounting substrate 21 to a process of surface roughening such as graining. This enables a further increased degree of light diffusion.

Figure 3:
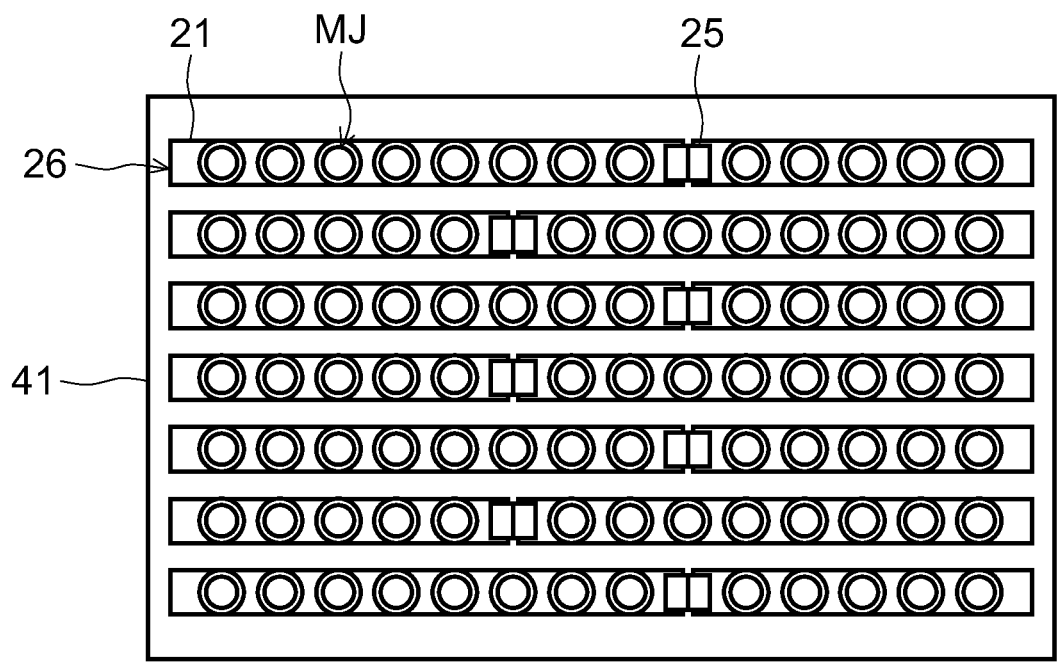
FIG. 3 is a plan view showing a disposition of mounting substrates.

The mounting substrate 21 has a rectangular strip shape, and on a mounting surface 21U that is an upper surface of the mounting substrate 21, a plurality of electrodes (not shown) are formed in a line parallel to a longitudinal direction of the mounting substrate 21 at a predetermined spacing from each other, and the LED 22 is mounted on each of the electrodes. The mounting substrate 21 is used as a common substrate shared by a plurality of LEDs 22. That is, as shown in FIGS. 1 and 3, a plurality of light emitting modules MJ each including the LED 22 and the diffusion lens 24 are disposed in the line parallel to the longitudinal direction of the mounting substrate 21 at a predetermined spacing from each other, in this case, at a predetermined equal spacing from each other. The mounting substrate 21 is fixed to the chassis 41 appropriately by, for example, being swaged, bonded, screwed, or riveted thereto.

Since a plurality of LEDs 22 are disposed on the mounting substrate 21 that has a shape having a longitudinal direction, and the mounting substrate 21 in that state is installed on the chassis 41, compared with a case where the LEDs 22 are installed on the chassis 41 one by one, work efficiency can be improved. Furthermore, since the plurality of LEDs 22 are disposed in the line parallel to the longitudinal direction of the mounting substrate 21, how the LEDs 22 are installed is determined univocally depending on how the mounting substrate 21 is installed, and thus designing a disposition of the LEDs 22 is facilitated. Since the plurality of LEDs 22 are disposed in the line at an equal spacing from each other, how the LEDs 22 are disposed does not vary depending on the type of the mounting substrate 21, and thus the mounting substrate 21 can be used even in a case where the backlight unit 49 is changed in size.

The embedded reflection sheet 11 is disposed between the mounting substrate 21 and the diffusion lens 24. The embedded reflection sheet 11 is fixed at a position on the mounting surface 21U at which the mounting surface 21U faces a lower surface of the diffusion lens 24. The embedded reflection sheet 11 has a light reflectance higher than that of the mounting substrate 21. The embedded reflection sheet 11 also has a circular shape in plan view and is concentric with the diffusion lens 24. The diameter of the embedded reflection sheet 11 is larger than that of the diffusion lens 24.

The embedded reflection sheet 11 is a foamed resin sheet having a multitude of minute air bubbles inside, and reflects light by actively utilizing interfacial reflection of the air bubbles, thus having a high light reflectance. It is desirable to adopt an existing sheet that is made of polyethylene terephthalate (PET) and has a reflectance of 98% or higher. A through hole for passing therethrough each of leg portions 24a of the diffusion lens 24 is formed through the embedded reflection sheet 11.

The diffusion lens 24 has a circular shape in plan view and is provided with the plurality of leg portions 24a at a lower surface thereof. Each of the leg portions 24a is passed through the through hole of the embedded reflection sheet 11 and is then bonded at its tip end to the mounting surface 21U of the mounting substrate 21 by use of an adhesive, and thus the diffusion lens 24 is mounted to the mounting substrate 21. The presence of the leg portions 24a provides a gap between the mounting substrate 21 and the diffusion lens 24. An airflow through this gap cools the LED 22. Provided that the problem of heat radiation can be solved, it is also possible to use a light emitting module of an integrally molded type obtained by embedding an LED in a diffusion lens.

Various types of LEDs can be used as the LED 22. For example, there can be used an LED of a type obtained by applying a phosphor having a light emission peak in a yellow region to a blue light emitting chip to gain white light. Also, there can be used an LED of a type obtained by applying phosphors having light emission peaks in green and red regions, respectively, to a blue light emitting chip to gain white light. Moreover, there can be used an LED of a type obtained by applying a phosphor having a light emission peak in a green region to a blue light emitting chip and by using the blue light emitting chip in combination with a red light emitting chip to gain white light. In addition, there can be used an LED of a type using, in combination, light emitting chips of respective colors of blue, green, and red to gain white light.

A white light emitting LED emits white light that tends to vary in color tone due to, for example, a high degree of blueness. White light emitted in any of the above-described manners has a leveled color tone, and thus illumination light with a substantially uniform color tone can be obtained.

Other types of LEDs that can also be used include a type using an ultraviolet light chip in combination with a phosphor, particularly, a type obtained by applying phosphors having light emission peaks in blue, green, and red regions, respectively, to an ultraviolet light chip to gain white light.

In a case where an ultraviolet light chip is used as a light source, resulting light tends to vary in color tone. On the other hand, with the above-described configuration, resulting light has a leveled color tone, and thus illumination light with a substantially uniform color tone can be obtained.

There are two types of the mounting substrate 21: one type has eight light emitting modules MJ arranged thereon, the other has five light emitting modules MJ arranged thereon. When a comparison is made, naturally, the former has a length longer than that of the latter. Two mounting substrates 21 of these long and short types are arranged so as to be aligned with each other along the longitudinal direction thereof and are connected to each other with a connector 25, thus forming a mounting substrate row 26. On each of the mounting substrates 21, a point of connection established by the connector 25 is spaced from one of the light emitting modules MJ adjacent thereto at a distance equal to a spacing between each pair of adjacent ones of the light emitting modules MJ.

The connector 25 is made up of a plug connector half and a socket connector half, which are mounted respectively to opposed end portions of the two mounting substrates 21, one of the two mounting substrates 21 has five light emitting modules MJ and the other has eight. At least one of the connector halves protrudes outward from the end portion of the mounting substrate 21 to which the connector half is mounted. Thus, the connector halves can be easily connected to each other. In the embodiment shown in FIG. 1, both of the connector halves protrude outward from the respective end portions of the mounting substrates 21 to which the connector halves are mounted, respectively.

Seven mounting substrate rows 26 in total are disposed in parallel so that each of them is parallel to a longitudinal direction of the chassis 41. On the mounting substrate 21, the light emitting modules MJ are arranged in the direction of a long side of the chassis 41, namely, in a direction indicated by an arrow X in FIG. 1, and the mounting substrate rows 26 are arranged in the direction of a short side of the chassis 41, namely, in a direction indicated by an arrow Y in FIG. 1. The light emitting modules MJ and the connectors 25 are, therefore, arranged in a matrix form. In each of the seven mounting substrate rows 26, two mounting substrates 21 of the respective long and short types are disposed so that their positions are reversed row by row. In the direction in which the mounting substrate rows 26 are arranged, namely, in the arrow Y direction, the positions of the connectors 25 are, therefore, not aligned straight but are in a zigzag arrangement.

The reflection sheet 42 having a similar shape in plan view to the chassis 41 is laid on the chassis 41. As the reflection sheet 42, a foamed resin sheet of a type similar to the type used for the embedded reflection sheet 11 is used. A circular pass-through opening 42H1 having a size sufficient to pass the diffusion lens 24 therethrough but insufficient to pass the embedded reflection sheet 11 therethrough is formed through the reflection sheet 24 so as to correspond to the position of each of the light emitting modules MJ, and thus the light emitting modules MJ are each exposed through the pass-through opening 42H1. Furthermore, a rectangular pass-through opening 42H2 for exposing the connector 25 is also formed through the reflection sheet 42 so as to correspond to the position of each of the connectors 25.

When the LED 22 of the light emitting module MJ lights up, the diffusion plate 43 is irradiated from behind with light emitted from the LED 22. A part of the light that does not travel directly toward the direction of the diffusion plate 43 is reflected by the embedded reflection sheet 11 and by the reflection sheet 42 toward the diffusion plate 43. The light is diffused inside the diffusion plate 43, so that, from the outside, the diffusion plate 43 is viewed as being a plane with relatively uniform luminance.

LEDs 22 on the pair of mounting substrates 21 connected with the connector 25, or all of the LEDs 22, may be electrically connected in series. With this configuration, a current of equal magnitude can be supplied to each of the LEDs 22, and thus the amount of light emitted from each of the LEDs 22 can be made uniform, so that the luminance uniformity of the diffusion plate 43 can be improved.

Figure 4:
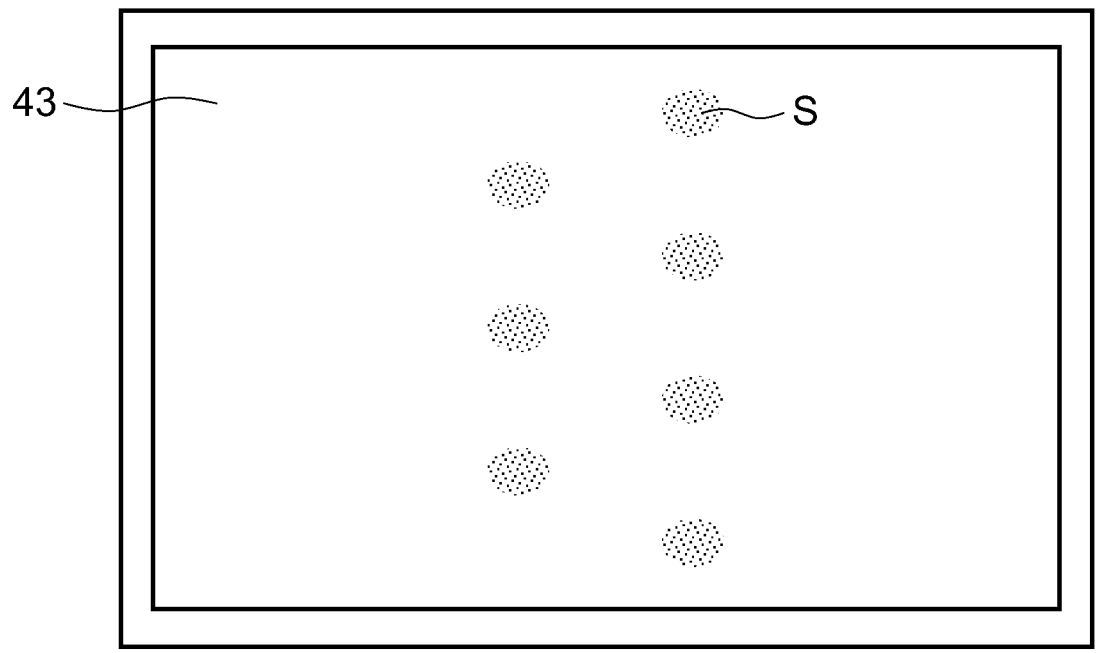
FIG. 4 is a plan view of a diffusion plate illuminated in a case where the mounting substrates are disposed as shown in FIG. 3.

As shown in FIG. 4, due to the presence of the connectors 25 exposed from the reflection sheet 42, shadows S appear on a luminance surface of the diffusion plate 43. Since the positions of the connectors 25 are not aligned straight, the shadows S are dispersed. Thus, unevenness in luminance of the diffusion plate 43 is obscured.

If the connectors 25 have a high light reflectance, the shadows S are obscured. With this in view, the connector 25 is configured so that an outer surface thereof, namely, a part thereof that is exposed to the outside when the connector 25 connects the mounting substrates 21 has a bright color. Specifically, an envelope of the connector 25 is formed using a selected material or painted so as to have a bright color such as white, ivory, or light gray. This increases the light reflectance of the connector 25, and thus the connector 25 becomes less likely to absorb light, so that unevenness in luminance of the diffusion plate 43 is obscured.

The disposition of the mounting substrates of the foregoing embodiment is not to be construed as limiting the subject matter of the invention. The number of the mounting substrate rows 26, the number of the light emitting modules MJ to be supported by one mounting substrate 21, a matrix pattern of the light emitting modules MJ, and so on can be set freely. Furthermore, although in the foregoing embodiment, in each of the mounting substrate rows 26, a long mounting substrate 21 and a short mounting substrate 21 are disposed so that their positions are reversed row by row, there are also other methods by which the mounting substrate rows 26 can be arranged in a mixed state where positions of the long mounting substrate 21 and the short mounting substrate 21 in one row are reversed in another row. For example, a method can be adopted in which, in each of the first two rows of the mounting substrate rows 26, the mounting substrate 21 of the long type is disposed on the left side and the mounting substrate 21 of the short type is disposed on the right side, while in each of the second two rows of the mounting substrate rows 26, the mounting substrate 21 of the short type is disposed on the left side and the mounting substrate 21 of the long type is disposed on the right side, and for the remaining rows, this reversing takes place repeatedly.

Figure 5:
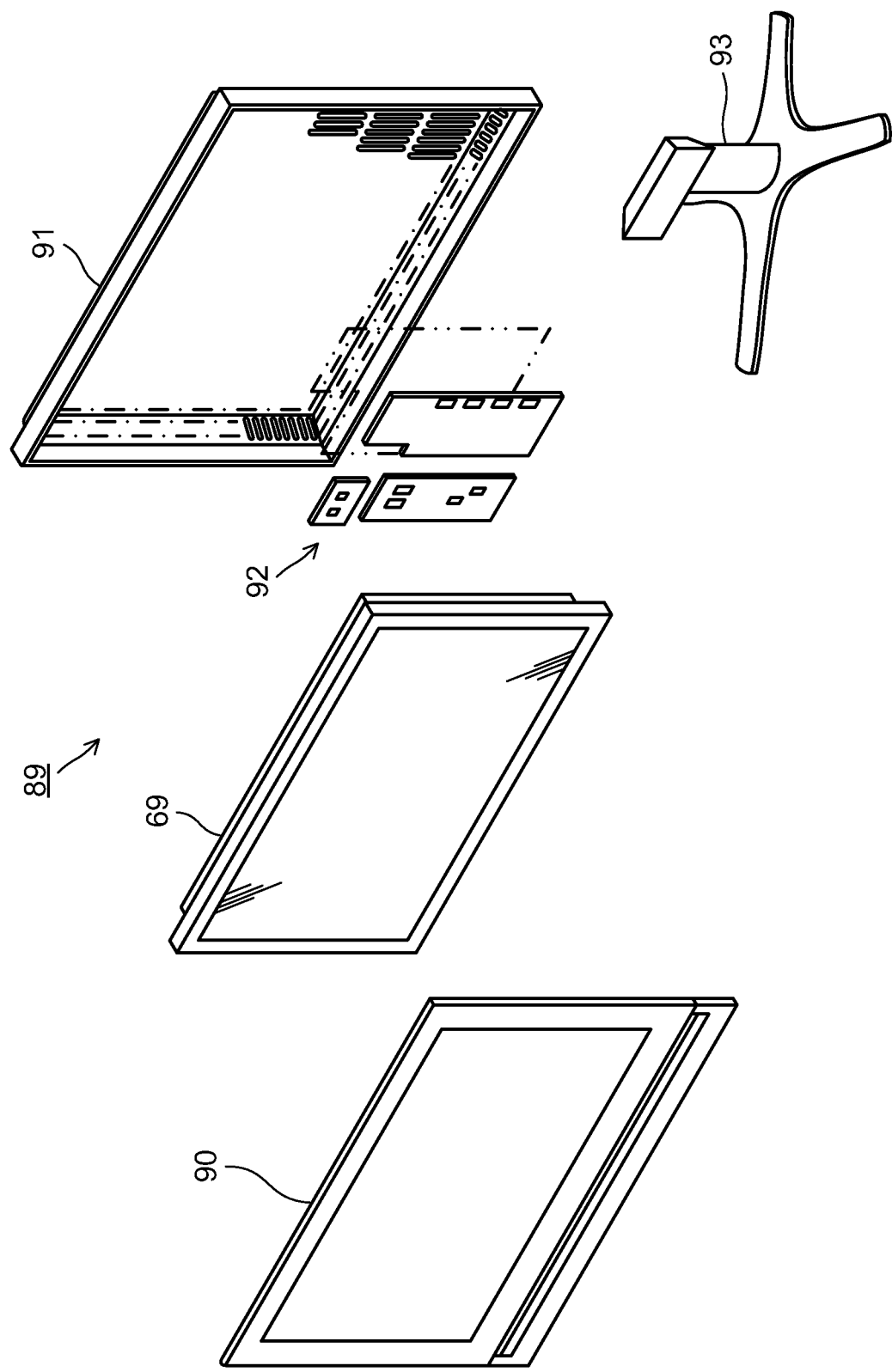
FIG. 5 is an exploded perspective view of a television receiver.

FIG. 5 shows an example of a configuration of a television receiver into which the display device 69 is incorporated. A television receiver 89 has a configuration in which, in a cabinet formed by joining a front cabinet part 90 and a rear cabinet part 91 together, the display device 69 and a control board group 92 are housed, and the cabinet is supported by a stand 93.

The foregoing has discussed the embodiment of the present invention. The present invention, however, is not limited to the scope described therein and may be effected in variously modified forms without departing from the spirit of the invention.

INDUSTRIAL APPLICABILITY

The present invention can be broadly applied to an illumination device in which a diffusion plate is irradiated with light from a light source. Furthermore, the present invention can be broadly applied also to a display device including the illumination device and further to a television receiver including the display device.

LIST OF REFERENCE SYMBOLS 49 backlight unit
41 chassis
43 diffusion plate
MJ light emitting module
21 mounting substrate
22 LED
24 diffusion lens
11 embedded reflection sheet
25 connector 42 reflection sheet
42H1, 41H2 pass-through opening
59 liquid crystal display panel
69 display device
89 television receiver

The invention claimed is:

1. An illumination device, comprising:
a diffusion plate;
a chassis that supports the diffusion plate; and
a light source that is disposed on the chassis and made up of a plurality of mounting substrates each supporting a plurality of point light sources,
wherein a plurality of the mounting substrates are connected to each other with a connector to form a mounting substrate row,
a plurality of the mounting substrate rows are disposed in parallel,
a long mounting substrate and a short mounting substrate form the mounting substrate row,
a disposition of the long and the short mounting substrates are reversed row by row, and
positions of the connectors are not aligned straight in a direction in which the mounting substrate rows are arranged.

2. The illumination device according to claim 1, wherein the chassis has a rectangular shape in plan view, and
the mounting substrate row is disposed parallel to a longitudinal direction of the chassis.

3. The illumination device according to claim 1, wherein each of the mounting substrates has a shape having a longitudinal direction, and
a plurality of the mounting substrates are aligned with each other along the longitudinal direction to form the mounting substrate row.

4. The illumination device according to claim 3, wherein the plurality of point light sources are disposed in a line parallel to the longitudinal direction of each of the mounting substrates.

5. The illumination device according to claim 4, wherein the plurality of point light sources are disposed in the line at an equal spacing from each other.

6. The illumination device according to claim 1, wherein the connector is made up of a combination of connector halves that are mounted respectively to one and the other of the mounting substrates to be connected, and
at least one of the connector halves protrudes outward from an end portion of the mounting substrate to which the connector half is mounted.

7. The illumination device according to claim 1, wherein an outer surface of the connector has a bright color.

8. The illumination device according to claim 1, wherein the point light sources on the mounting substrate are electrically connected in series as one unit.

9. The illumination device according to claim 1, wherein a plurality of the mounting substrate rows are covered with a reflection sheet, and
pass-through openings for exposing the point light sources and the connectors are formed through the reflection sheet.

10. The illumination device according to claim 1, wherein each of the point light sources is a light emitting element mounted on the mounting substrate, and
the light emitting element is covered with a lens.

11. An illumination device, comprising:
a diffusion plate;
a chassis that supports the diffusion plate; and
a light source that is disposed on the chassis and made up of a plurality of mounting substrates each supporting a plurality of point light sources,
wherein a plurality of the mounting substrates are connected to each other with a connector to form a mounting substrate row,
a plurality of the mounting substrate rows are disposed in parallel,
a long mounting substrate and a short mounting substrate form the mounting substrate row,
a disposition of the long and the short mounting substrates are reversed row by row,
positions of the connectors are not aligned straight in a direction in which the mounting substrate rows are arranged,
each of the point light sources is a light emitting element mounted on the mounting substrate,
the light emitting element is covered with a lens, and
the lens has a light diffusing function.

12. The illumination device according to claim 11, wherein the light diffusing function is imparted to the lens by subjecting a surface of the lens on a side of the mounting substrates to a process of surface roughening.

13. An illumination device, comprising:
a diffusion plate;
a chassis that supports the diffusion plate; and
a light source that is disposed on the chassis and made up of a plurality of mounting substrates each supporting a plurality of point light sources,
wherein a plurality of the mounting substrates are connected to each other with a connector to form a mounting substrate row,
a plurality of the mounting substrate rows are disposed in parallel,
a long mounting substrate and a short mounting substrate form the mounting substrate row
a disposition of the long and the short mounting substrates are reversed row by row,
positions of the connectors are not aligned straight in a direction in which the mounting substrate rows are arranged,
each of the point light sources is a light emitting element mounted on the mounting substrate,
the light emitting element is covered with a lens, and
the light emitting element is an LED.

14. The illumination device according to claim 13, wherein the LED is obtained by applying a phosphor having a light emission peak in a yellow region to a blue light emitting chip to gain white light.

15. The illumination device according to claim 13, wherein the LED is obtained by applying phosphors having light emission peaks in green and red regions, respectively, to a blue light emitting chip to gain white light.

16. The illumination device according to claim 13, wherein the LED is obtained by applying a phosphor having a light emission peak in a green region to a blue light emitting chip and by using the blue light emitting chip in combination with a red light emitting chip to gain white light.

17. The illumination device according to claim 13, wherein the LED is obtained by using, in combination, light emitting chips of respective colors of blue, green, and red to gain white light.

18. The illumination device according to claim 13, wherein the LED is obtained by using an ultraviolet light chip in combination with a phosphor.

19. The illumination device according to claim 18, wherein the LED is obtained by applying phosphors having light emission peaks in blue, green, and red regions, respectively, to an ultraviolet light chip to gain white light.

20. A display device, comprising:
the illumination device according to claim 1; and
a display panel that receives light from the illumination device.

21. The display device according to claim 20, wherein the display panel is a liquid crystal display panel.

22. A television receiver comprising the display device according to claim 20.

* * * * *